United States Patent [19]

Oldham

[11] Patent Number: 4,559,272

[45] Date of Patent: Dec. 17, 1985

[54] HEAT CURABLE POLYGLYCIDYL AROMATIC AMINE ENCAPSULANTS

[75] Inventor: Susan L. Oldham, Long Beach, Calif.

[73] Assignee: Hughes Aircraft Company, El Segundo, Calif.

[21] Appl. No.: 608,615

[22] Filed: May 9, 1984

[51] Int. Cl.$^4$ ............... B05D 5/12; C08G 59/28
[52] U.S. Cl. ............... 428/418; 264/272.13; 264/272.19; 264/331.12; 427/58; 427/104; 427/116; 528/92; 528/94; 528/341
[58] Field of Search ............... 528/99, 341, 92; 264/272.13, 272.19, 272.18; 427/58, 116, 104

[56] References Cited

U.S. PATENT DOCUMENTS

| | | | |
|---|---|---|---|
| 2,951,825 | 9/1960 | Reinking et al. | 528/99 |
| 2,978,435 | 4/1961 | Ernst | 528/99 X |
| 3,449,641 | 6/1969 | Lee | 317/234 |
| 3,489,952 | 1/1970 | Hinchley | 317/100 |
| 3,683,044 | 8/1972 | Huang et al. | 260/830 TW |
| 3,816,365 | 6/1974 | Schmid et al. | 260/22 D |
| 3,849,383 | 11/1974 | Fetscher et al. | 260/75 N |
| 3,915,780 | 10/1975 | Broussard | 156/244 |
| 4,127,695 | 11/1978 | Hirakawa et al. | 427/116 X |

OTHER PUBLICATIONS

Dean et al., "Specifying HV Potting Compounds", 15th National SAMPE Technical Conference, Oct. 4–6, 1983, pp. 511–518.

Price et al., "Evaluation Selection of Encapsulating Plastics for Ordnance Electronic Assemblies: Final Report," under Contract DAAK 21-79-C-0017, AD A118714, May 1981.

Kelchner et al., "In Situ Grown Fiber Reinforcement for Improved High Voltage Component Encapsulants," 26th National SAMPE Symposium, Apr. 28–30, 1981, vol. 26, pp. 444–461.

Primary Examiner—Earl Nielsen
Attorney, Agent, or Firm—Mary E. Lachman; A. W. Karambelas

[57] ABSTRACT

A highly fluid, solventless heat curable resin is formulated from an admixture comprising a polyglycidyl aromatic amine, a polycarboxylic acid anhydride curing agent, and a curing accelerator. The heat curable formulation exhibits low viscosity and is useful as an encapsulant and insulation for electrical members exposed to high electrical stress. Magnetic coils encapsulated with the cured formulation resist corona discharge at electrical stresses in excess of 2100 volts per mil.

9 Claims, No Drawings

HEAT CURABLE POLYGLYCIDYL AROMATIC AMINE ENCAPSULANTS

BACKGROUND OF THE INVENTION

1. Field of the Invention

The present invention relates to polyepoxide compositions and more particularly to heat curable polyepoxide compositions suitable for encapsulating electrical components.

2. Description of the Prior Art

High voltage power supplies and pulse forming networks for aerospace use must meet high standards of performance and reliability for long periods under extreme environmental conditions. To assure trouble-free operation of components within the assembly, the components are commonly encapsulated or impregnated with synthetic resin materials to provide electrical insulation to the component and to protect the components and equipment from possible detrimental environmental effects which might cause failures of some sort. Thus, electrical components such as magnetic coils, capacitors and diode bridges are pre-encapsulated (i.e. coated with primary encapsulation) prior to assembly into the finished power supply. Primary encapsulation of components provides many advantages including excellent dielectric characteristics, mechanical ruggedness during assembly, ease of mounting and environmental resistance. However, in spite of these advantages the components are frequently found to be unreliable and fail during use due to the crevices or low pressure voids remaining in the insulation after the encapsulation process. These voids constitute areas of low dielectric strength. If these defects occur in high electric fields, the phenomenon known as corona or partial electrical discharge will occur, degrading the insulation and causing an eventual short circuit. To be acceptable for commercial use, the encapsulated electrical component, such as a magnetic coil, should encounter no corona at operating electrical stresses, e.g. 1000 volts per mil (V/mil).

Because of their excellent adhesion, good mechanical, humidity and chemical properties, epoxy resins are used extensively as encapsulating compositions for electrical and electronic components.

Current state-of-the-art, high reliability, electrical component primary encapsulants are generally composed of diglycidyl ethers of bisphenol A, epoxylated phenol-formaldehyde, novolac resins or combinations thereof. The epoxy resins are rendered heat curable by the incorporation of a stoichiometric amount of a curing or hardening agent such as an aromatic amine, for example, metaphenylene diamine or benzyldimethylamine. Athough these epoxy resin formulations have been used successfully as electrical and electronic encapsulating agents, such materials are rigid and not crack-resistant. Further, the viscosity of these materials, is still too high, e.g. 500 centipoise (cps) at 75° F. (24° C.), to be considered easily workable; and during encapsulation, these compositions are not intruded completely into voids and crevices present in the electrical components, which causes incomplete insulation. In addition to their high viscosities, these epoxy resin materials have long gel times and mold dwell (e.g. 45 minutes and 2 hours, respectively), as well as requiring vacuum processing (e.g. 20–30 micrometers mercury pressure) under vacuum/hydrostatic gas pressures. The long processing cycles and the use of high vacuum equipment are major factors in the high cost of encapsulated electrical products fabricated using these epoxy resins. There is thus a need in the art for higher reliability, faster curing epoxy resin compositions suitable as encapsulants which are capable of withstanding high electric stress.

SUMMARY OF THE INVENTION

In accordance with the present invention, there is provided a fast gelling, solventless heat curable polyepoxide which, when cured, acts as a solid insulation and encapsulating system of high reliability which is corona free at electrical stresses substantially in excess of 2100 V/mil. The uncured polyepoxide resin system exhibits a very low viscosity at ambient temperatures, which ensures its usefulness as an impregnating and encapsulating composition for electrical components, where void-free impregnation is critical, using conventional molding techniques, e.g. transfer molding, at relatively moderate pressures and without the employment of high vacuum processing required in state-of-the-art epoxy resin encapsulation systems.

The heat curable polyepoxide composition of the present invention is comprised of a polyglycidyl aromatic amine, a polycarboxylic acid anhydride curing agent, and a curing accelerator.

DETAILED DESCRIPTION OF THE INVENTION

The term "polyglycidyl aromatic amine" refers to a polyepoxide compound which is an N-glycidyl amino compound conventionally prepared by reacting a halohydrin such as epichlorohydrin with an aromatic amine. Polyglycidyl aromatic amine compounds are known to the art. For example, U.S. Pat. No. 2,951,822 teaches N-glycidyl amino compounds prepared by reacting epichlorohydrin with primary aromatic amines such as aniline and 4'4-diaminodiphenyl methane. U.K. Pat. No. 816,923 teaches preparing N,N'-diepoxides by reacting epichlorohydrin with a 4,4'-monocycloalkylaminodiphenyl methane. U.S. Pat. No. 3,014,895 teaches polyglycidyl aromatic amines prepared by the reaction between 4,4'-diaminophenyl sulfone and epichlorohydrin. U.S. Pat. No. 3,683,044 teaches the preparation of polyglycidyl xylylene diamine by the reaction between xylylene amine and epichlorohydrin. Representative polyglydicyl aromatic amines which are useful in the practice of the present invention include diglycidyl aniline, diglycidyl orthotoluidine, tetraglycidyl metaxylylene diamine, and mixtures thereof.

The polyglydicyl aromatic amines are admixed with the polycarboxylic acid anhydride curing agents to provide heat curable polyepoxide resins which are cross-linkable at a moderate temperature, e.g. about 212° F. (100° C.), to form thermoset compositions. Suitable polycarboxylic acid anhydride curing agents include nadic methyl anhydride (i.e., a maleic anhydride adduct of methyl cyclopentadiene), methyl tetrahydrophthalic anhydride and methyl hexahydrophthalic anhydride.

The amount of curing agent employed will depend upon the composition and equivalent weights of the curing agent and the polyglycidyl compound and the properties desired in the cured resin. In general, the amount of curing agent employed should provide sufficient anhydride groups and carboxylic acid groups, if present, to react with from about 60 to about 90 percent, and preferably with about 70 to about 85 percent, of the epoxide groups present in the polyglycidyl aromatic amine composition.

The term "curing" as used herein denotes the conversion of the thermosetting polyglydcidyl aromatic amine/polycarboxylic acid anhydride composition into an insoluble and infusible cross-linked product and, in particular, as a rule, with simultaneous shaping to give shaped members.

Cure accelerators are employed in preparing the heat curable polyglycidyl aromatic amine resin formulations, in order to provide a low curing temperature. Known cure accelerators may be used in the practice of the present invention, and the preferred accelerators are substituted imidazoles, such as 2-ethyl-4-methyl imidazole, and organometallic compounds, such as stannous octoate, cobalt octoate, and butyl tin dilaurate. The cure accelerators are incorporated in the heat curable polyglycidyl aromatic amine resins at a concentration of about 0 to about 3 parts by weight per 100 parts resin (i.e., polyglycidyl species).

The particular polyglycidyl aromatic amine, polycarboxylic acid anhydride and curing accelerator chosen to prepare the encapsulant composition can be mixed in any conventional fashion. The polycarboxylic acid anhydride curing agent and the accelerator can be mixed into the polyglycidyl amine at room temperature. The use of the polyglycidyl aromatic amine systems of the present invention provides a highly fluid, low viscosity, solvent-free, polyepoxide encapsulating system. For example, systems comprising a polyglycidyl aromatic amine, such as diglycidyl aniline, in combination with a polycarboxylic acid anhydride, such as nadic methyl anhydride, have viscosities in the range of 125 to 500 centipoise (cps) when measured at 25° C. (75° F.), the temperature at which curing can be readily accomplished. Gel times at 212° F. (100° C.) for the resin formulations of this invention vary from about 10 to 45 minutes, with the majority having gel times of about 20 minutes. (Gel time is defined as the time at which the formulation begins to solidfy and harden.) The low viscosity and fast gel time characteristics of the heat curable polyglycidyl aromatic amine formulations of the present invention make these formulations especially suitable as encapsulants for electrical members such as magnetic coils, transformers, stator generators, diode arrays, resistor networks, and capacitors. By using such low viscosity resins in encapsulation processes, total wetting and complete impregnation of electrical components is readily accomplished resulting in homogenous, void-free encapsulated structures.

Encapsulation of electrical members by the heat curable polyglycidyl aromatic amine resin formulations of the present invention may be effected by any conventional molding method, including transfer molding and compression molding procedures in which the electrical member is loaded into a cylinder with the encapsulant formulation, and curing is effected under vacuum, followed by increased pressure. In addition, conventional batch processing may be used in encapsulate electrical members with the composition of the present invention. A preferred method for encapsulating articles in accordance with the present invention is the vacuum liquid transfer molding technique disclosed in my copending patent application Ser. No. 608,614 filed 5/9/84 and described in further detail in Example 8 herein. Because of the low viscosity and short gel time, the composition of the present invention is particularly well suited for such vacuum liquid transfer molding techniques. After encapsulation, the encapsulated electrical member is subjected to post curing conditions of 275° to 325° F. (135° to 163° C.) for 2 to 4 hours to insure total cross-linking of the encapsulant.

The following examples illustrate, but do not limit the present invention.

EXAMPLES 1-7

A series of heat curable polyglycidyl aromatic amine resin formulations was prepared using a variety of polyglycidyl aromatic amine compounds and polycarboxylic acid anhydride curing agents. The compositions of these formulations are summarized in Table I below.

TABLE I

Composition of Formulations

| COMPONENTS | COMPONENT CONCENTRATION PARTS PER HUNDRED RESIN (gm) IN FORMULATION NO. | | | | | | |
|---|---|---|---|---|---|---|---|
| | 1 | 2 | 3 | 4 | 5 | 6 | 7 |
| Diglycidyl aniline | 100 | 100 | 100 | 50 | — | — | — |
| Diglycidyl ortho-toluidine | — | — | — | 50 | — | 100 | 100 |
| Tetraglycidyl meta xylylene diamine | — | — | — | — | 100 | — | — |
| Nadic methyl anhydride | — | 122 | — | 118 | — | 48 | 100 |
| Methyl tetrahydro-phthalic anhydride | 114 | — | — | — | 139 | — | — |
| Methyl hexahydro-phthalic anhydride | — | — | 100 | — | — | 48 | — |
| Stannous octoate | 3 | — | — | — | — | — | — |
| 2-ethyl-4-methyl imidazole | — | 3 | 3 | 1 | 3.4 | 2 | 2 |

*"Resin" means the polyglycidyl species.

The polyglycidyl aromatic amine and polycarboxylic acid anhydride components were mixed at 75° F. (24° C.) until uniform and then the other components were blended into the mixture.

The physical properties of these formulations are summarized in Table II below.

TABLE II

| PHYSICAL PROPERTIES | Physical Properties of Formulations FORMULATION NUMBER | | | | | | |
|---|---|---|---|---|---|---|---|
| | 1 | 2 | 3 | 4 | 5 | 6 | 7 |
| Gel Time at 212° F. (100° C.) (minutes) | 12 | 20 | 13.5 | 45 | 20 | 19.5 | 25.5 |
| Barcol Hardness | 32 | 39 | 22 | 29 | 40 | 30 | 32 |
| Dielectric Constant (at 1 KHz) | 2.83 | 4.52 | 3.52 | 3.99 | 2.93 | 4.5 | 3.72 |
| Dissipation Factor (at 1 KHz) | 0.0054 | 0.0064 | 0.0066 | 0.0063 | 0.0102 | 0.0051 | 0.0054 |
| Glass Transition (°C.) | 119 | 177 | 130 | 125 | 191 | 135 | 137 |
| Temperature (°F.) | 246 | 351 | 266 | 257 | 376 | 275 | 279 |
| Decomposition (°C.) | 315 | 275 | 325 | 300 | 325 | 305 | 280 |
| Temperature (°F.) | 599 | 527 | 617 | 572 | 617 | 581 | 536 |

TABLE II-continued

| PHYSICAL PROPERTIES | Physical Properties of Formulations FORMULATION NUMBER | | | | | | |
|---|---|---|---|---|---|---|---|
| | 1 | 2 | 3 | 4 | 5 | 6 | 7 |
| Viscosity (cps) | 125 | 500 | 130 | 227 | 150 | 160 | 220 |

EXAMPLE 8

Using the procedure described in my copending patent application Ser. No. 608,614, a magnetic coil was encapsulated in accordance with the present invention, as follows. A standard test magnetic coil comprising 2 layers of copper windings (75 turns on both the primary and secondary windings), separated by 3 mils of insulation and having a length of 2 inches (5.08 cm) and a diameter of 1 inch (2.54 cm) was loaded into a cleaned steel mold which was 3 inches (7.6 cm) wide and 7.25 inches (18.4 cm) long. The mold was preheated to 212° F. (100° C.), the temperature at which hardening of the heat curable epoxy resin formulation was initiated. The mold was placed in a transfer press and two hundred grams of the epoxy resin of Formulation No. 1 of Table I were metered into the mold containing the coil. A vacuum of 1 to 4 millimeter (mm) mercury pressure was applied to the mold and maintained on the assembly for 2 minutes to impregnate the coil with the resin and to degas the resin materials in the mold. The vacuum was then released and the assembly held in this passive vacuum state for an additional 2 minutes. Thereafter, a constant positive pressure of approximately 90 pounds per square inch (psi) or about $6.2 \times 10^6$ pascals was imposed on the coil/resin system in the mold for about 2 hours at 212° F. (100° C.). During this pressurization stage, it was estimated that about 50 percent by weight of the resin was bled from the mold. The coil having a 2 mil layer of resin encapsulation was removed from the mold, whereafter it was post cured for about 3 hours in an oven set at 275° F. (135° C.).

Using the above-described procedure, three separate magnetic coils were encapsulated with Formulation No. 1 shown in Table I. The resistance of the encapsulated coils to electrical stress is recorded in Table III, for Formulation No. 1, 1a and 1b, and is discussed below.

For purposes of comparison, magnetic coil units were also batch encapsulated using a vacuum impregnator apparatus, such as that manufactured by Hull Corporation of Massachusetts, and a heat curable epoxy resin conventionally used to encapsulate magnetic coils. The conventional heat curable epoxy resin comprised a eutectic amine-cured diglycidyl ether of bisphenol A, and, more specifically comprised 100 parts by weight of EPON 825 (available from Shell Chemical Company) having a viscosity at 75° F. (24° C.) of 4000 to 6000 cps and an epoxide equivalent of 172 to 178, and 18 parts by weight of a mixed amine curing agent.

The conventional heat curable epoxy resin had the following physical properties:

| | |
|---|---|
| Gel Time at 212° F. (100° C.) (minutes) | 45 |
| Barcol Hardness | 12 |
| Dielectric Constant (at 1 KHz) | 4.69 |
| Dissipation Factor (at 1 KHz) | 0.0080 |
| Glass Transition (°C.) | 108 |
| Temperature (°F.) | 226 |
| Decomposition Temperature (°C.) | 230 |
| (°F.) | 446 |
| Viscosity (cps) | 485 |

In the comparative runs, the heat curable epoxy resin was flowed into the mold cavity at 20–30 micrometers Hg pressure and cured at 212° F. (100° C.) for 4 hours, and post baked at 266° F. (130° C.) for 4 hours.

The resistance to electrical stresses of the magnetic coils encapsulated with the heat curable polyglycidyl aromatic amine formulation No. 1 and the coils encapsulated with the comparative conventional heat curable epoxy resin formulation (identified as "Control") are recorded in Table III below. These electrical stress tests are interwinding discharge tests which evaluate the characteristics and quality of the insulation system.

TABLE III

| Formulation No. | CIV (1) (KRMS) | Breakdown Voltage (2) (KRMS) | 30 Second Counts at Peak Heights (PC) (3) | | | | | Total Counts (4) (PC/sec) | Electric Stress (V/mil) |
|---|---|---|---|---|---|---|---|---|---|
| | | | 2.0 | 5.0 | 10 | 25 | 50 | | |
| 1 | — | 6.93 | 0 | 0 | 0 | 0 | 0 | 0 | 2310 |
| 1a | 8.0 | — | 1 | 0 | 0 | 0 | 0 | 0 | 2670 |
| 1b | 7.62 | — | 88 | 23 | 0 | 0 | 0 | 9.7 | 2540 |
| Control A | 6.0 | — | 0 | 0 | 0 | 0 | 0 | 0 | 2000 |
| Control B | — | 6.0 | 0 | 0 | 0 | 0 | 0 | 0 | 2000 |
| Control C | 5.0 | — | 0 | 0 | 0 | 0 | 0 | 0 | 1670 |
| Control D | 4.75 | — | 10 | 24 | 36 | 0 | 0 | 16.7 | 1580 |
| Control E | 4.62 | — | 141 | 56 | 2 | 0 | 0 | 19.4 | 1540 |

NOTES TO TABLE III
(1) CIV is the corona inception voltage or the starting point of corona discharge, and was measured with a Biddle Corona Tester.
(2) Breakdown voltage is the voltage at which the insulator breaks down, and is a measure of the short-term dielectric strength of the insulator. It is measured by applying an AC voltage until arc-over through the insulation occurs.
(3) PC (picocoulombs) is a measure of energy and is measured with a Biddle Corona Tester and Discharge Energy Counter. The material is tested for a 30-second count, which is a convenient time period for establishing the discharge rate of picocoulombs/second. The number of peak heights of a given value of picocoulombs is measured for 30 seconds. A pass/fail criterion is used, with a value of over 100 failing.
(4) Total counts is a calculated average of the values measured in the 30-second counts discussed above.

The significantly improved resistance to electrical stress exhibited by the formulations of the present invention (Formulation Nos. 1, 1a, and 1b) as compared to conventional material (Formulation Nos. Control A, B, C, D, and E) is evident in Table III. This improved performance is due to both the improved dielectric properties of the formulations of the present invention and the low viscosity of these formulations which permits more thorough impregnation of the target material (e.g., the magnetic coil) by the formulation. In the control formulation, the higher viscosities cause less thorough impregnation of the target. In addition, using the latter materials and known encapsulation methods, the results obtained are highly dependent on variations in process parameters. Thus, the compositions of the present invention provide effective encapsulation of high reliability electronic devices and electrical components that will be subjected to high electrical stresses and high temperature stresses. As previously discussed, devices such as a magnetic coil, encapsulated in accordance with the present invention have improved electrical characteristics due to the low dielectric constant and high corona resistance of the encapsulant of the present invention. In particular, the use of the compositions of the present invention in conjunction with the vacuum liquid transfer molding technique disclosed herein provides high reliability, low cost, high voltage molded devices.

While specific components of the present system are defined above, many other variables may be introduced which may in any way affect, enhance or otherwise improve the system of the present invention. These are intended to be included herein. Although variations are shown in the present application, many modifications and ramifications will occur to those skilled in the art upon a reading of the present disclosure. These, too, are intended to be included herein. Furthermore, while the present invention has been described with particular emphasis on encapsulating electrical components, it will be recognized that the improved properties and good processing characteristics of the compositions of the present invention make these compositions useful for other purposes. For example, the low dielectric constant of the compositions of the present invention make them useful for encapsulating electronic devices, such as transistors, memories, or integrated circuits. In addition, the compositions of the present invention are useful for pre-impregnating woven fibers or fabric in the formation of composites, and as structural molding materials.

What is claimed is:

1. A method for encapsulating an electrical component to provide resistance to corona discharge at electrical stresses of about 2100 volts per mil or more in said component comprising:
   (a) impregnating said component with a low viscosity, heat curable composition comprising an uncured polyglycidyl aromatic amine, a polycarboxylic acid anhydride curing agent, and a chosen curing accelerator; and
   (b) curing said composition to form an encapsulating layer on said component, said layer being capable of withstanding electric stress of at least 2100 volts per mil.

2. The method of claim 1 wherein said polyglycidyl aromatic amine is selected from the group consisting of diglycidylaniline, diglycidyl orthotoluidine, tetraglycidyl metaxylylene diamine, and mixtures thereof.

3. The method of claim 1 wherein said curing agent is selected from the group consisting of nadic methyl anhydride, methyl tetrahydrophthalic anhydride, and methyl hexahydrophthalic anhydride.

4. The method of claim 1 wherein said curing accelerator is selected from the group consisting of stannous octoate and 2-ethyl-4-methyl imidazole.

5. An encapsulated electrical component capable of withstanding electric stress of at least 2100 volts per mil comprising the electrical component having adhered thereon an encapsulating layer formed by the method of claim 1.

6. The method of claim 1 wherein the polycarboxylic acid anhydride is present in sufficient quantity to react with from about 60 to about 90 percent of the epoxide groups in said polyglycidyl aromatic amine.

7. The method of claim 1 wherein said curing accelerator is present in the amount of about 0 to about 3 percent, by weight.

8. The method of claim 1 wherein:
   (a) said uncured polyglycidyl aromatic amine is diglycidyl aniline and is present in the amount of about 100 parts per hundred resin by weight;
   (b) said curing agent is methyl tetrahydrophthalic anhydride and is present in the amount of about 114 parts per hundred resin by weight; and
   (c) said curing accelerator is stannous octoate and is present in the amount of about 3 parts per hundred resin by weight.

9. The method of claim 1 wherein:
   (a) said uncured polyglycidyl aromatic amine is diglycidyl orthotoluidine and is present in the amount of about 100 parts per hundred resin by weight;
   (b) said curing agent is nadic methyl anhydride and is present in the amount of about 100 parts per hundred resin by weight; and
   (c) said curing accelerator is 2-ethyl-4-methyl imidazole and is present in the amount of about 2 parts per hundred resin by weight.

* * * * *

UNITED STATES PATENT AND TRADEMARK OFFICE
CERTIFICATE OF CORRECTION

PATENT NO. : 4,559,272

DATED : December 17, 1985

INVENTOR(S) : Susan L. Oldham

It is certified that error appears in the above—identified patent and that said Letters Patent is hereby corrected as shown below:

Col. 1, line 38, before "use",
　　　　　　　insert --high voltage--.

Col. 5, line 68 to Col. 6, line 1,
　　　　　　　delete "Hull Corporation of Massachusetts"
　　　　　　　and insert therefor --Red Point, a
　　　　　　　division of Epoxylite of Irvine,
　　　　　　　California--.

Signed and Sealed this

Twenty-ninth Day of July 1986

[SEAL]

Attest:

DONALD J. QUIGG

Attesting Officer　　　Commissioner of Patents and Trademarks